(12) United States Patent
Olschewski et al.

(10) Patent No.: US 6,814,190 B1
(45) Date of Patent: Nov. 9, 2004

(54) SCREW ACTUATOR, AND BRAKE CALIPER COMPRISING SUCH ACTUATOR

(75) Inventors: Armin Herbert Emil August Olschewski, Schweinfurt (DE); Henrikus Jan Kapaan, Nieuwegein (NL); Clair Druet, Clarafond (FR); Thomas Wilhelm Fucks, Aachen (DE); Jacobus Zwarts, Nieuwegein (NL); Johannes Albertus Van Winden, Heidelberg (DE); Andries Christian Rinsma, Leeuwarden (NL); Jiri Gurka, Behamberg (AT)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/700,023

(22) PCT Filed: May 18, 1999

(86) PCT No.: PCT/NL99/00303

§ 371 (c)(1),
(2), (4) Date: Feb. 23, 2001

(87) PCT Pub. No.: WO99/60285

PCT Pub. Date: Nov. 25, 1999

(30) Foreign Application Priority Data

May 18, 1998 (NL) .................................... 1009197

(51) Int. Cl.$^7$ ............................................. F16D 55/08
(52) U.S. Cl. ................................. 188/72.8; 188/162
(58) Field of Search .......................... 188/162, 158, 188/72.2, 72.7, 72.8, 71.9; 192/84.6, 84.7

(56) References Cited

U.S. PATENT DOCUMENTS

| | | | |
|---|---|---|---|
| 2,988,609 A | | 6/1961 | Evans, Jr. |
| 4,596,316 A | * | 6/1986 | Crossman .................. 188/72.1 |
| 4,850,457 A | * | 7/1989 | Taig .......................... 188/72.1 |
| 5,107,967 A | * | 4/1992 | Fujita et al. ............... 188/72.1 |
| 5,219,048 A | * | 6/1993 | Shaw et al. ................ 188/72.1 |
| 5,302,008 A | * | 4/1994 | Miyake et al. ................ 303/14 |
| 5,348,123 A | * | 9/1994 | Takahashi et al. ......... 188/72.1 |
| 5,593,234 A | * | 1/1997 | Liston ........................ 384/492 |
| 5,788,341 A | * | 8/1998 | Penrod et al. ........... 303/115.2 |
| 6,012,556 A | * | 1/2000 | Blosch et al. .............. 188/71.8 |
| 6,230,855 B1 | * | 5/2001 | Holding ..................... 188/158 |
| 6,367,592 B1 | * | 4/2002 | Kapaan et al. ............. 188/72.1 |

FOREIGN PATENT DOCUMENTS

| | | |
|---|---|---|
| DE | 195 11 287 A1 | 1/1996 |
| EP | 0 275 783 A3 | 7/1988 |
| EP | 0 582 307 A1 | 2/1994 |
| GB | 2 199 097 A | 6/1988 |
| GB | 2 291 949 A | 2/1996 |
| WO | WO 96/03301 | 2/1996 |
| WO | WO 97/17553 * | 5/1997 |

* cited by examiner

Primary Examiner—Douglas C. Butler
Assistant Examiner—Bradley King
(74) Attorney, Agent, or Firm—Oliff & Berridge, PLC

(57) ABSTRACT

A screw actuator which has a housing, a motor, an actuating member and a screw mechanism which provides a linear movement of the actuating member with respect to the housing in response to a rotational movement of the motor. The screw mechanism has a screw and a nut engaging each other by rolling elements, one of the screw or the nut is rotatbly supported with respect to the housing, and a reduction gear means. The nut is fixed with repect to the housing, and the screw is rotatably supported with respect to the housing by mean of rolling elements.

20 Claims, 3 Drawing Sheets

SCREW ACTUATOR, AND BRAKE CALIPER COMPRISING SUCH ACTUATOR

BACKGROUND OF THE INVENTION

1. Field of Invention

The invention is related to a screw actuator, comprising an actuating member and a screw mechanism having a screw, nut and rolling elements, one of which screw and nut is rotatably supported with respect to the housing and providing a linear movement of the actuating member with respect to the housing in response to a rotational movement of the motor, and a reduction gear means.

2. Description of Related Art

Such screw actuator is known from GB-A-229 1949. Said known screw actuator comprises a screw mechanism which is supported with respect to the housing by means of a bearing capable of accommodating axial and/or radial loads, e.g. an axial thrust bearing for accommodating the axial forces exerted on the brakepads.

This screw mechanism is a so-called roller screw mechanism. Depending on the application condition constraints i.e. space available, and load, one can select a roller screw or a ball screw type actuator. Specific application considerations for a roller screw is that such roller screw mechanism provides a high power density, which means that within specific dimensional constraints, a relatively high load carrying capacity can be provided. Said carrying capacity however is predominantly related to axial loads. With respect to radial loads, the carrying capacity is less favourable compared to a ball screw. A roller screw mechanism is in general more sensitive with respect to radial loads and misalignment.

Another specific component in a roller screw mechanism is the cage which is necessary to space the rollers. In high speed applications this cage mass results in higher starting torques.

SUMMARY OF THE INVENTION

The object of the invention is to provide an improved actuator. This object is achieved in that the nut is fixed with respect to the housing, and the screw is rotatably supported with respect to the housing by means of the rolling elements. Said rolling elements may comprise rollers or balls.

In order to obtain about the same load bearing capacity as in a roller screw mechanism, the pitch diameter of the rolling balls, the ball diameter and its contact angle with screw and nut, and the number of turns should be designed such that appropriate dimensions and the required load carrying capacity are provided. However, as the rolling elements of the mechanism can also act as bearing elements for supporting the rotating screw, no separate bearing is necessary to take up the axial load. As a result, the overall dimensions for a ball screw mechanism may remain limited in order to meet application requirements.

The ball screw mechanism is less sensitive with respect to radial loads, which makes it less vulnerable for misalignments. Also, no cage is needed for recirculation of the balls. Instead, recirculation of the balls may be obtained by means of recirculation tube or hole plug between the first and the last ball row or for each ball turn.

The axial moving and rotating screw according to the invention may be driven by the reduction gear means through a coupling means which allows axial displacements. Said coupling means may comprise a drive shaft accommodated within a bore in the screw, the surface of the drive shaft and the bore having axial grooves which engage each other through balls or splines.

The screw may engage the actuating member through a bearing capable to cope with radial and axial load in order to stop the rotating motion in relation to the moving actuating member.

The reduction gear means is preferably contained in a reduction gear module and the screw mechanism is contained in a screw mechanism module. These modules may be in laterally shifted positions.

The actuating member may be executed as a piston, which is slidably held within a cylinder space of the housing. Said piston can be held non-rotatably by means of a groove and pin assembly. The motor drive module can be mounted in-line with the actuator or in angled position.

In other exemplary embodiments of this invention there may be a continuously variable transmission comprising two pulleys, each having two discs enclosing a V-shaped groove, as well as a belt engaging said grooves, the discs of each pulley being movable towards and away from each other so as to continually change the running radius of the belt, wherein the discs of each pulley are displaceable by means of an actuator according to this invention.

For a right angle position of the motor module, the reduction gear means may comprise one or more reduction steps with at least part of a planetary gear system having a stationary outer ring gear wheel with inwardly pointing gear teeth. In particular, the reduction gear means may comprise satellite gear wheels which mesh with the ring gear wheel and which are accommodated on a carrier connected to a rotary shaft engaging the screw mechanism, and the sun gear wheel of the planetary gear system may be accommodated on a drive shaft of the drive module. This system provides an optimal axial compactness of the application.

The sun gear wheel of the reduction gear means is connected to an angled or right angle gear reduction e.g. a bevel gear which mates with a motor driven bevel pinion. Said sun gear wheel and the bevel gear are carried out as a unitary gear wheel which is supported with respect to the nut of the screw mechanism by means of a rolling element bearing. In order to achieve an appropriate reduction, the pitch diameter of the bevel gear is larger than the pitch diameter of the sun gear wheel. The screw, nut, rolling elements and reduction gear components may be obtained by hard turning.

Furthermore, a sensor fixed on a bearing or near the motorshaft may be provided for detecting rotational and/or translational movements of the screw mechanism or other operating parameters. Also, control means may be provided, said control means having an input for a control signal, e.g. from a brake pedal, and being connected to the sensor for controlling the electric motor on the basis of the control signal and the signal from the sensor. The sensor is in particular suitable for obtaining force feedback, wear compensation and/or maintenance indication.

The actuator according to the invention can be applied for different purposes. In particular, the actuator is suitable for use in a brake caliper for an electrically actuatable disc brake, said caliper comprising an actuator as described before, and a claw piece carrying two opposite brake pads, said actuator comprising a screw and a nut one of which is rotatably supported with respect to the housing by means of an angular bearing, and a reduction gear means.

The invention will further be described with reference to the embodiments of FIGS. 1 and 2.

DETAILED DESCRIPTION OF INVENTION

Figure 1:
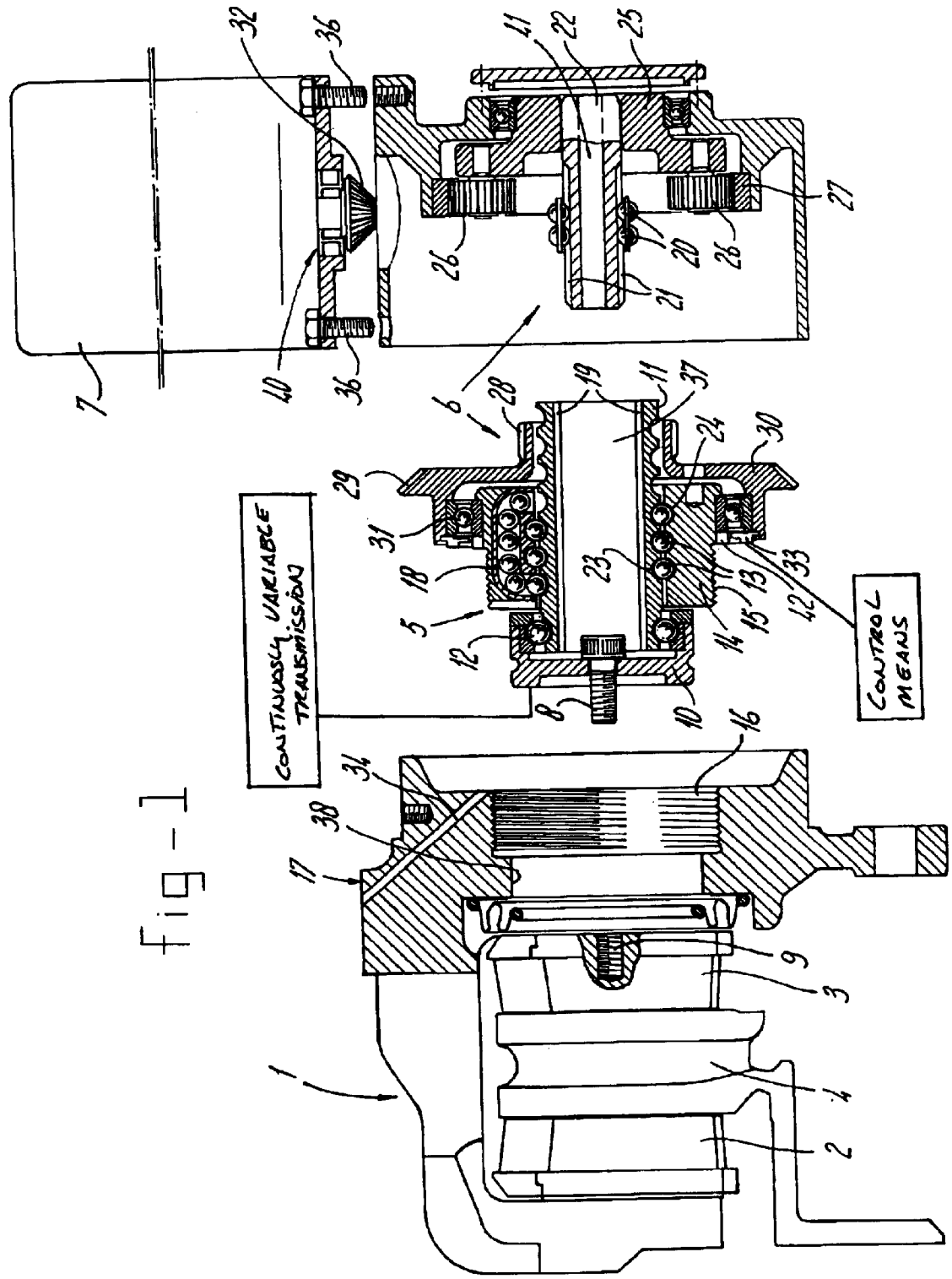
FIG. 1 shows a brake caliper, comprising an actuator according to the invention, in exploded view.
Figure 2:
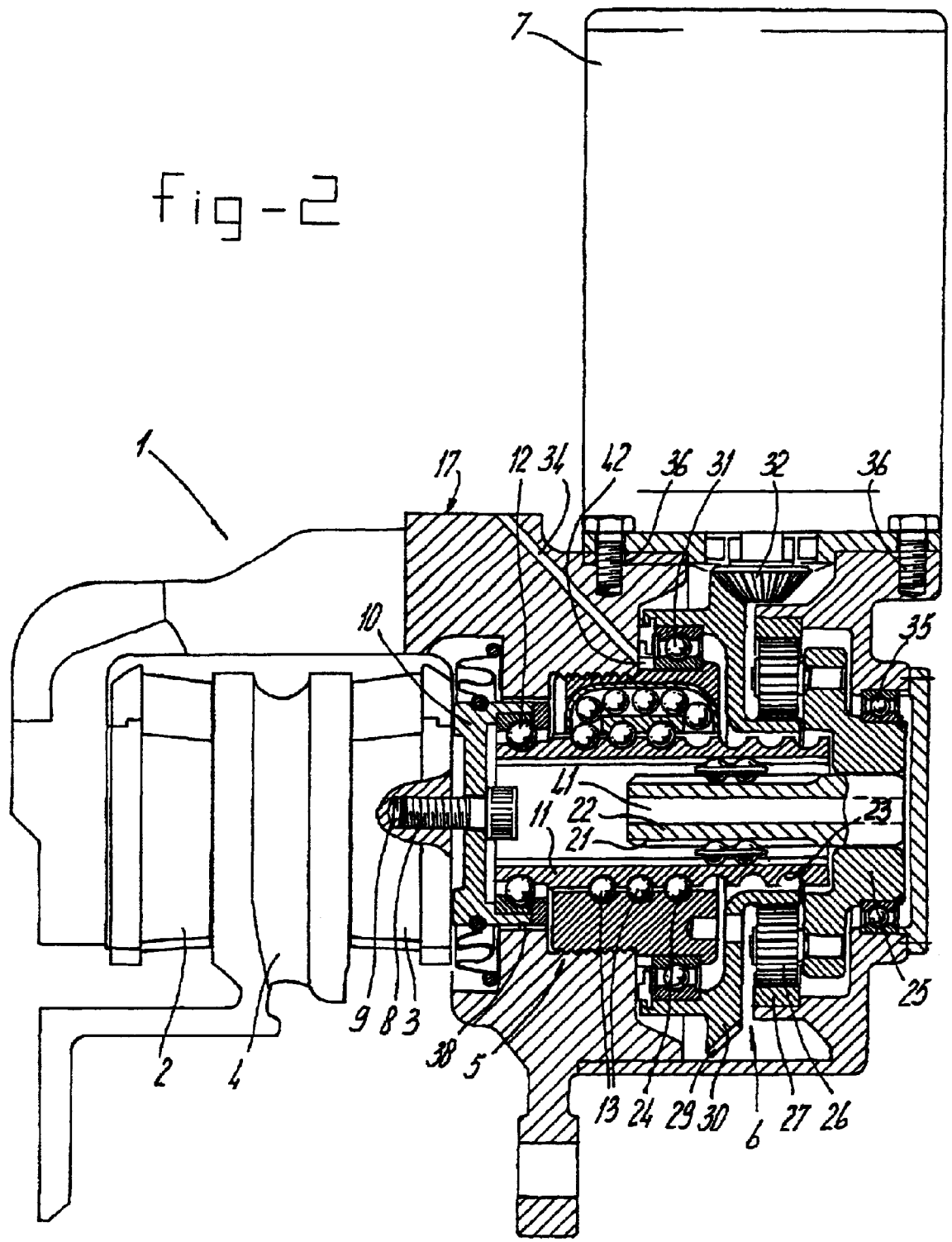
FIG. 2 shows the brake caliper according to FIG. 1, in assembled state.

The brake caliper shown in FIGS. 1 and 2 comprises a claw piece 1 carrying a fixed brake pad 2 and a displaceable brake pad 3. Said brake pads 2, 3 can be brought into co-operation with brake disc 4.

The displaceable brake pad 3 engages a ball screw mechanism 5 which by means of reduction gear means 6 is driven by motor 7. Said motor may be a hydraulic or pneumatic motor. Said motor 7 may be provided with a sensor 40, connected to the motor shaft. The screw mechanism may have a coating such as a diamond like carbon coating.

More in particular, the displaceable brake pad 3 is connected by means of bolt 8 and screwthreaded hole 9 to an actuating member 10. Said actuating member 10 engages the screw 11 by means of a bearing 12 capable to take up axial load. In other exemplary embodiments the screw (11) may be rigidly connected to the actuating member. Said actuating member is carried out as a piston 10, which is slidably, but non-rotatably held in a cylinder space 38 in the housing 17. In other exemplary embodiments the piston may be lrotatably held in the cylinder space 38.

By means of balls 13, screw 11 engages the nut 14. Said nut 14 has an external screwthread 15, by means of which the nut 14 is connected to the housing 17. Moreover, a recirculating tube 18 for recirculating the balls 13 upon rotating the screw 11 with respect to said nut 14, extends through the nut.

The screw 11 has a bore 37 with internal grooves 19, which engage balls 20. Said balls 20 also engage the external grooves 21 of drive shaft 22.

By rotating drive shaft 22 through reduction gear means 6 and motor 7, the screw 11 is rotated as well. As a result, it is displaced backward or forward by the co-operation or its screw type groove 23 with the screw type groove 24 of the nut 14, by means of the balls 13.

Drive shaft 22 is connected to a carrier 25, which carries satellite gear wheels 26. Said satellite gear wheels 26 each engage a ring gear wheel 27 as well as a sun gear wheel 28.

Sun gear wheel 28 forms a unity with bevel gear 29 which together form a unitary gear wheel 30. Said unitary gear wheel 30 by means of bearing 31 is supported with respect to the nut 14.

The bevel gear 29 engages the bevel pinion 32, which in turn is driven by motor 7.

The bearing 31, which supports the unitary gear wheel with respect to the nut 14, comprises a sensor 33 for detecting the rotations of the screw mechanism, and thereby the displacement of the displaceable brake pad 3.

Housing 17 comprises a bore 34, through which a wire can be guided to the outside from said sensor 33.

The carrier 25 is supported with respect to the housing 17 by means of bearing 35; by means of bolts 36, motor 7 is connected to said housing 17.

Figure 3:
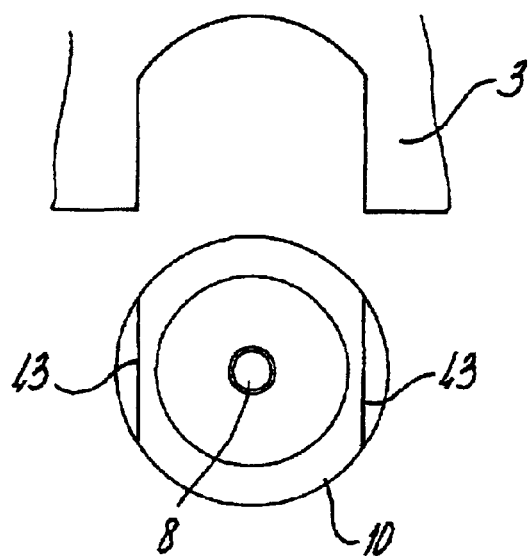
FIG. 3 shows a detail.

According to the detail of FIG. 3, the connection between brake pad 3 and piston 10 may alternatively be obtained through edges which are slidable mounted in grooves 43 of piston 10.

Figure 4:
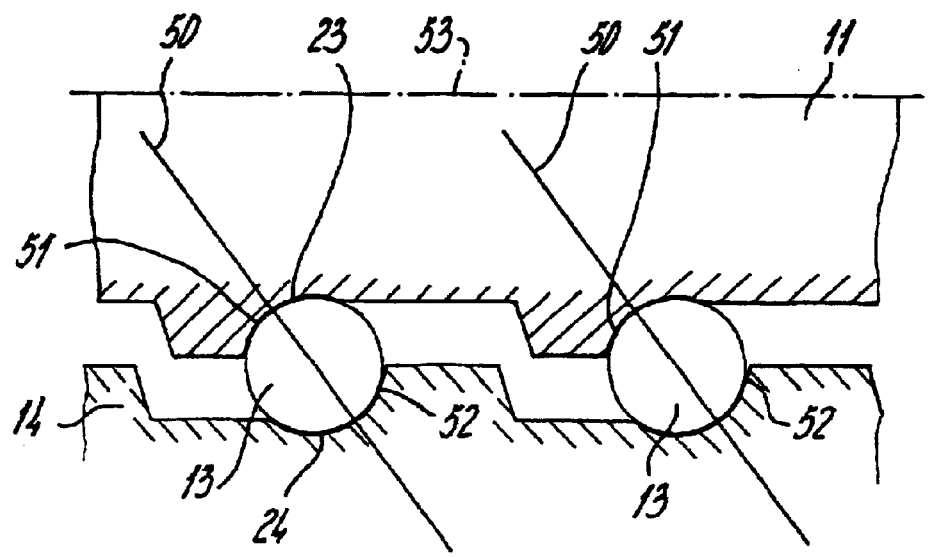
FIG. 4 shows a detail of the ball screw.

In order to accommodate the axial forces exerted on the ball screw mechanism when applying a brake force on the brake pads 2, 3, the screw threads 23, 24 of screw 11 respectively nut 14 can be adapted according to the embodiment shown in FIG. 4 In cross-section, the threads 23 have raised parts 51, whereas the threads 24 have raised part 52.

As a result of these shapes, the working lines 50 as defined by the contact angles and the ball conformity with the ball tracks, which define the load paths which play a role in the force transfer, are in a more inclined position. The contact angle is between 45–70° in order to create optimized load carrying capacity for the ball screw in relation to the applied load specification.

What is claimed is:

1. Screw actuator, comprising a housing, a motor, an actuating member and a screw mechanism which provides a linear movement of the actuating member with respect to the housing in response to a rotational movement of the motor, which screw mechanism comprises a screw, a nut engaging each other by a plurality of first rolling elements, and a reduction gear means, wherein the nut is axially fixed with respect to the housing, and the screw is rotatably supported with respect to the housing by means of the rolling elements and wherein the screw engages the actuating member through a pluralitv of second rolling elements capable of carrying at least one of an axial load and a radial load.

2. Actuator according to claim 1, wherein the screw is rotationally driven by the reduction gear means through a coupling means which allows axial displacements.

3. Actuator according to claim 2, wherein the coupling means comprises a shaft accommodated within a bore in the screw, the surface of the shaft and bore having axial grooves which engage each other through balls.

4. Actuator according to claim 1, wherein the reduction gear means is contained in a reduction gear module and the screw mechanism is contained in a screw mechanism module.

5. Actuator according to claim 4, wherein the reduction gear means comprises at least two gear reduction steps.

6. Actuator according to claim 4, wherein the reduction gear means comprises at least one of a planetary gear reduction step and a right angle gear reduction step.

7. Actuator according to claim 1, wherein the actuating member is a piston, which is slidably held within a cylinder space of the housing.

8. Actuator according to claim 1, wherein the piston is held non-rotatably by means of a groove and pin assembly, or by means of a ball/groove assembly.

9. Actuator according to claim 7, wherein the cylinder space is formed in the housing.

10. Actuator according to claim 4, wherein the modules are axially aligned.

11. Actuator according to claim 4, wherein the reduction gear means comprises at least part of a planetary gear system having a stationary outer ring gear with inwardly pointing gear teeth.

12. Actuator according to claim 11, wherein the reduction gear means comprises satellite gear wheels which mesh with the ring gear and which are accommodated on a carrier connected to the shaft engaging the screw mechanism.

13. Actuator according to claim 11, wherein the sun gear wheel of the reduction gear means is connected to a bevel gear which mates with a motor gear, by an angled gear transmission.

14. Actuator according to claim 13, wherein the sun gear wheel and the bevel gear are carried out as a unitary gear wheel which is supported with respect to the nut of the screw mechanism by means of rolling element bearing.

15. Actuator according to claim 13, wherein the pitch diameter of the bevel gear is larger than the pitch diameter of the sun gear wheel.

16. Actuator according to claim 1, wherein a sensor is provided for detecting rotational and/or translational movements of the screw mechanism.

17. Actuator according to claim 1, wherein balls or rollers of the screw mechanism are coated so as to maintain the proper function of the screw under dry-running conditions with a diamond-like carbon coating.

18. Actuator according to claim 1, wherein the motor is an electric motor.

19. Actuator according to claim 1, wherein the screw mechanism comprises rolling balls, and the grooves in the screw and nut are arranged for adapted contact angles in view of improved axial load bearing capacity.

20. Brake caliper for an electrically actuatable disc brake, said caliper comprising an actuator according to claim 1, and a claw piece carrying two opposite brake pads said actuator comprising a screw mechanism the screw of which is rotatably supported with respect to the housing by means of the balls of the screw mechanism, a reduction gear means and a motor.

* * * * *